US012317026B2

(12) United States Patent
Wang

(10) Patent No.: US 12,317,026 B2
(45) Date of Patent: May 27, 2025

(54) EAR HOOK PERSONAL SOUND DEVICE

(71) Applicant: SHENZHEN LONGWEI TECHNOLOGY CO., LTD, Shenzhen (CN)

(72) Inventor: Xinhong Wang, Sichuan (CN)

(73) Assignee: SHENZHEN LONGWEI TECHNOLOGY CO., LTD, Shenzhen (CN)

( * ) Notice: Subject to any disclaimer, the term of this patent is extended or adjusted under 35 U.S.C. 154(b) by 184 days.

(21) Appl. No.: 18/245,582

(22) PCT Filed: Dec. 11, 2021

(86) PCT No.: PCT/CN2021/137275

§ 371 (c)(1),
(2) Date: Mar. 16, 2023

(87) PCT Pub. No.: WO2022/135192

PCT Pub. Date: Jun. 30, 2022

(65) Prior Publication Data

US 2023/0370762 A1 Nov. 16, 2023

(30) Foreign Application Priority Data

Dec. 24, 2020 (CN) ......................... 202011555263.0

(51) Int. Cl.
*H04R 1/10* (2006.01)

(52) U.S. Cl.
CPC ........... *H04R 1/105* (2013.01); *H04R 1/1016* (2013.01); *H04R 2225/021* (2013.01); *H04R 2225/0213* (2019.05)

(58) Field of Classification Search
CPC H04R 1/105; H04R 1/1016; H04R 2225/021; H04R 2225/0213;
(Continued)

(56) References Cited

U.S. PATENT DOCUMENTS

2008/0123890 A1 5/2008 Peng

FOREIGN PATENT DOCUMENTS

CN 202222043 U 5/2012
CN 112738680 A 4/2021
(Continued)

OTHER PUBLICATIONS

WO-2020220733-A1, Zhang et al. “Earphone without Blocking Ears” 2020 (Year: 2020).*
(Continued)

*Primary Examiner* — Brian Ensey
(74) *Attorney, Agent, or Firm* — Tucker Ellis LLP

(57) ABSTRACT

An ear hook personal sound device is disclosed, including a housing, a speaker and a front conduction tube. One surface of the speaker is connected and sealed with the front conduction tube, a radiation port is formed on the speaker, and a distance for a sound wave radiated by the speaker to be conducted through the front conduction tube to an opening of an ear canal is less than 10 mm. The other surface of the speaker is hermetically connected with a rear conduction tube, a sound wave radiated by the other surface of the speaker is conducted to a back of an ear through the rear conduction tube, and a shortest conduction distance for a sound wave at an orifice of the rear conduction tube to be conducted to the opening of the ear canal is no less than 40 mm.

10 Claims, 3 Drawing Sheets

(58) Field of Classification Search
CPC .. H04R 1/1075; H04R 1/2849; H04R 1/2857; H04R 1/347; H04R 2460/09; H04R 1/1008; H04R 1/1091; H04R 1/1041; H04R 1/2873; H04R 2201/02
See application file for complete search history.

(56) References Cited

FOREIGN PATENT DOCUMENTS

| | | | |
|---|---|---|---|
| JP | 2018082324 | A | 5/2018 |
| WO | 2020220733 | A1 | 11/2020 |

OTHER PUBLICATIONS

International Search Report and Written Opinion of corresponding PCT application, PCT/CN2021/137275, dated Mar. 7, 2022, 8 pages.

* cited by examiner

EAR HOOK PERSONAL SOUND DEVICE

CROSS-REFERENCE TO RELATED APPLICATIONS

This application is a national stage filing under 35 U.S.C. § 371 of international application number PCT/CN2021/137275, filed Dec. 11, 2021, which claims priority to Chinese patent application No. 202011555263.0 filed Dec. 24, 2020. The contents of these applications are incorporated herein by reference in their entirety.

TECHNICAL FIELD

The disclosure relates to an ear hook personal sound device.

BACKGROUND

Earphones have good sound quality, portability and sound privacy, and are being accepted by more and more people as a portable personal music playback device, which is convenient for listening to music or talking on the phone during traveling. Moreover, due to the good sound privacy, no matter listening to music or talking on the phone, other people will not be disturbed, and call contents of the other party will not be revealed to lead to privacy eavesdropping. However, the earphones block ear canals of people, such that it is difficult for a listener to hear sound beside, thereby having some inconveniences and dangers.

1. Inconvenience in communication: since the ear canals are blocked, it is inconvenient to communicate, such that it is necessary to take off the earphones.
2. Potential dangers: when the ear canals are blocked, especially in a state of movement, it is inconvenient to hear some external danger signals, causing potential threats.

Bone conduction headset can overcome the above difficulties, but the sound quality is difficult to meet the requirements of most people for listening to music. Moreover, the bone conduction headset must have a certain clamping force, which oppresses people's skin, and long-term wearing will cause some discomfort.

The disclosure is made based on this situation.

SUMMARY

The disclosure aims to overcome the defects in the existing technology, and provide a personal music playback device hung on a human ear, which has excellent sound quality and portability, without blocking an ear canal.

The disclosure is realized by the following technical solutions.

An ear hook personal sound device includes a housing, a speaker and a front conduction tube, wherein one surface of the speaker is connected and sealed with the front conduction tube, a radiation port is formed on the speaker, and a distance for a sound wave radiated by the speaker to be conducted through the front conduction tube to an opening of an ear canal is d, d<=10 mm; and the other surface of the speaker is configured to directly radiate a sound wave to air to and to the opening of the ear canal or conduct the sound wave through a rear conduction tube to the opening of the ear canal, with a shortest conduction distance being a, a/d>8.

According to the ear hook personal sound device above, an orifice of the front conduction tube is provided with an inclined opening bent inwardly, with an angle θ of the opening satisfying a condition of $-60° < \theta < 60°$.

According to the ear hook personal sound device above, the rear conduction tube is hermetically connected with the other surface of the speaker, and after a sound wave radiated by the other surface of the speaker is conducted to a back of an ear through the rear conduction tube, a shortest conduction distance for the sound wave radiated by an orifice of the rear conduction tube to be conducted to the opening of the ear canal is a, a=>40 mm.

According to the ear hook personal sound device above, the speaker is arranged in front of the ear, a cross-sectional area error between the front conduction tube and the rear conduction tube does not exceed ±20%, and a length error does not exceed ±20%.

According to the ear hook personal sound device above, a cross-sectional area of the front conduction tube is no more than ½ of an effective radiation area of the speaker.

According to the ear hook personal sound device above, the speaker is arranged behind the ear, the front conduction tube is configured to bypass the ear and conduct the sound wave to a range of 10 mm near the opening of the ear canal, and lengths of the rear conduction tube and the front conduction tube are inconsistent.

According to the ear hook personal sound device above, the speaker is arranged in front of the ear near the ear canal, the rear conduction tube is configured to bypass the ear to conduct the sound wave to the back of the ear, and lengths of the rear conduction tube and the front conduction tube are inconsistent.

According to the ear hook personal sound device above, when the sound wave directly radiated to air by the speaker is conducted to the opening of the ear canal, the speaker is arranged behind the ear and has the shortest conduction distance a no less than 40 mm; and after the sound wave directly radiated to air by the speaker and the sound wave radiated by the orifice of the front conduction tube are smoothed by ⅓ octave, a difference between frequency response curves of front and rear sound waves is no more than 6 dB.

According to the ear hook personal sound device above, a tail end of the rear conduction tube is provided with a rear speaker, the rear speaker is connected and sealed with the rear conduction tube, and the speaker and the rear speaker drive air in the rear conduction tube to move in the same direction; and after a sound wave radiated to air by the rear speaker and the sound wave radiated by the orifice of the front conduction tube are smoothed by ⅓ octave, a difference between frequency response curves of front and rear sound waves is no more than 6 dB.

Compared with the existing technology, the disclosure has the following advantages.

1. According to the disclosure, the ear canal is unblocked, such that it is convenient for a user to hear ambient sound.
2. The disclosure has an excellent tone quality and does not need a clamping force. Since the sound is conducted through air in the disclosure, no specific clamping force is needed.
3. The disclosure has a good privacy, does not affect an ambient environment, and does not reveal listened contents.
4. The disclosure is portable, and the device of the disclosure can be hung on the ear, thereby being convenient for traveling.
5. The disclosure has rich bass, and the speaker is additionally provided with the conduction tubes, which will not increase a resonance frequency of the speaker like the addition of a box to the speaker, and instead will decrease the resonance frequency, thereby improving a low-frequency effect of the speaker.

Figure 1:
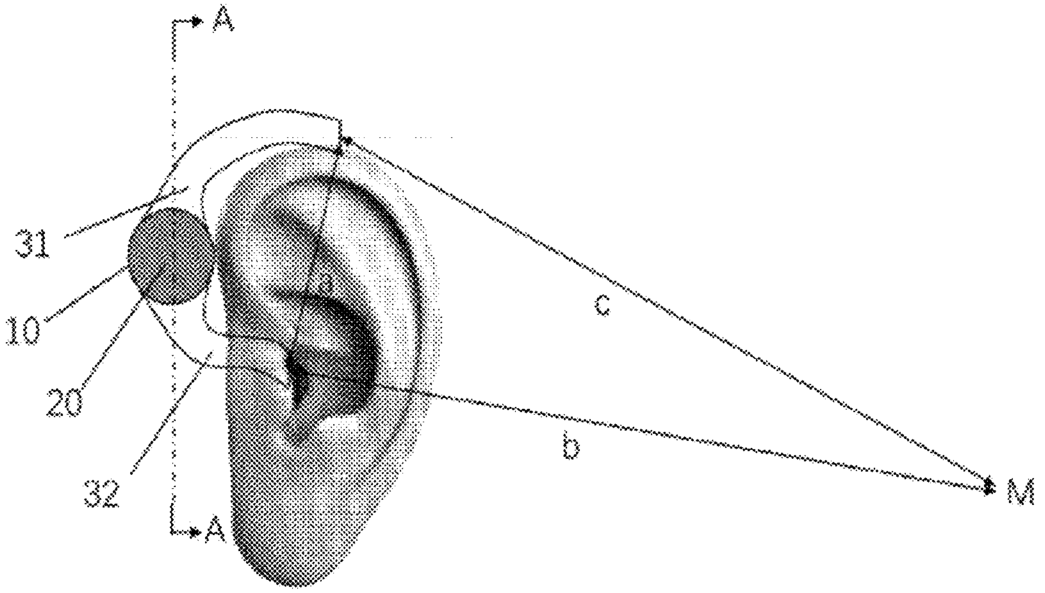
FIG. 1 is a schematic structural diagram of Embodiment One of the disclosure.

In the drawings, 10 refers to housing; 20 refers to speaker; 21 refers to rear speaker; 31 refers to rear conduction tube; 32 refers to front conduction tube; and 50 refers to radiation port.

DETAILED DESCRIPTION

The technical features of the disclosure will be further described in detail hereinafter with reference to the drawings to facilitate understanding by those of ordinary skills in the art.

The disclosure relates to an ear hook personal sound device, especially to a mechanical structure of the device.

The device includes a housing 10, a speaker 20 and a front conduction tube 32. One surface of the speaker 20 is connected and sealed with the front conduction tube 32, a radiation port 50 is formed on the speaker 20, and a distance for a sound wave radiated by the speaker 20 to be conducted through the front conduction tube 32 to an opening of an ear canal may be expressed as d, d<=10 mm.

According to the ear hook personal sound device, the ear canal is unblocked, which is convenient for a user to hear ambient sound, and the sound is spread through air. The ear hook personal sound device may be hung on the ear without a special clamping force, which is convenient for traveling.

Figure 4:
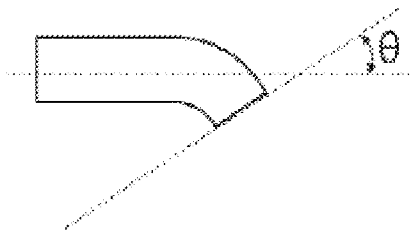
FIG. 4 is a schematic diagram of bending of an orifice of a conduction tube in the disclosure.

As shown in FIG. 4, in order to conduct the sound wave to the human ear more intensively, an inclined opening bent inwardly may be formed at an orifice of the front conduction tube 32, and an angle θ of the opening satisfies a condition of $-60° < θ < 60°$.

Figure 2:
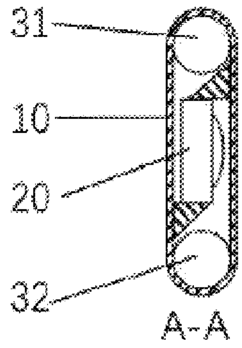
FIG. 2 is a cross-sectional view of an A-A direction in FIG. 1.

The structure of the device according to Embodiment One is shown in FIG. 1 and FIG. 2, and the device includes the housing 10, the speaker 20, the front conduction tube 32 and a rear conduction tube 31. Since sound waves radiated by front and back surfaces of the speaker 20 have the same amplitude and opposite phases, the sound waves radiated by the front and back surfaces are offset without any obstruction, such that the user cannot hear the bass, which is an acoustic short circuit phenomenon. In order to prevent this situation, it is necessary to design an acoustic conduction path to reduce or prevent acoustic short circuit. The front surface of the speaker 20 is connected and sealed with the front conduction tube 32, the sound wave radiated by the front surface of the speaker 20 is conducted to a vicinity of the opening of the ear canal through the front conduction tube 32, and a distance from the sound wave to the opening of the ear canal is d, d<=10 mm. Since the front conduction tube 32 is located at the opening of the ear canal in FIG. 1, and the distance d from the sound wave to the opening of the ear canal is about 0 mm, d cannot be shown in FIG. 1.

The front conduction tube 32 may be in any shape, a cross-sectional area of the front conduction tube may be adjusted according to design requirements, which is usually no more than ½ of an effective radiation area of the speaker 20. The back surface of the speaker 20 is connected and sealed with the rear conduction tube 31, the sound wave radiated by the back surface of the speaker 20 is conducted to a back of an ear through the rear conduction tube 31, and a distance from a tail end of the rear conduction tube 31 to the opening of the ear canal is a. The distance a is not a straight-line distance from the tail end of the rear conduction tube 31 to the opening of the ear canal. Since the sound wave needs to bypass an auricle, a is a minimum value of an actual conduction distance of the sound wave, which is no less than 40 mm. Since the sound wave is attenuated with the increase of the conduction distance, when the distance is doubled, an amplitude of the sound wave is attenuated by half (6 dB). Therefore, by increasing an a/d ratio, the sound wave radiated by the back surface of the speaker 20 may be much lower than the sound wave radiated by the front surface when conducted to the opening of the ear canal, such that the ear canal of the user mainly receives the sound wave radiated by the front surface of the speaker 20. When a/d>8, the sound wave radiated by the back surface has almost no effect on the ear canal, thereby realizing optimum tone quality.

For a person at a distant M point, a distance between the ear and the tail end of the front conduction tube 32 is b, and a distance between the ear and the tail end of the rear conduction tube 31 is c. Since both b and c are much greater than a, it may be considered that b≈c. Therefore, the sound waves radiated by the two conduction tubes have almost the same amplitude and opposite phases when conducted to the M point, such that the sound waves are offset with each other, and the sound waves heard in the distance are very weak. In order to achieve a best sound attenuation effect, a cross-sectional area error between the rear conduction tube 31 and the front conduction tube 32 does not exceed ±20%, and a length error does not exceed ±20%.

Figure 3:
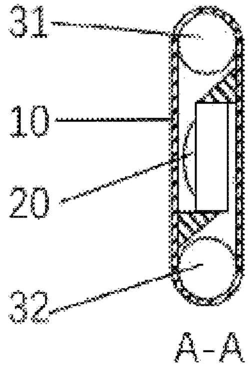
FIG. 3 is an A-A cross-sectional view of a speaker in Embodiment One of the disclosure which is arranged reversely.

Since the sound waves radiated by the front and back surfaces of the speaker 20 have the same amplitude and opposite phases, the speaker 20 of this embodiment may be used reversely, to derive Embodiment Two of the disclosure: the back surface of the speaker 20 is connected with the front conduction tube 32, and the front surface of the speaker 20 is connected with the rear conduction tube 31. As shown in FIG. 3, it can be seen that the front surface of the speaker 20 is connected with the rear conduction tube 31, while the back surface of the speaker 20 is connected with the front conduction tube 32. This embodiment has a similar effect to that of forward mounting of the speaker 20.

Figure 5:
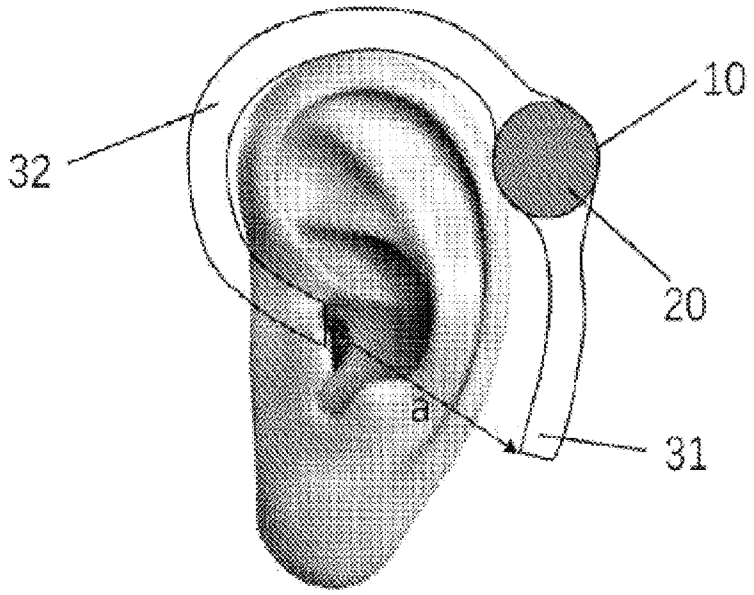
FIG. 5 is a schematic structural diagram of Embodiment Three of the disclosure.
Figure 6:
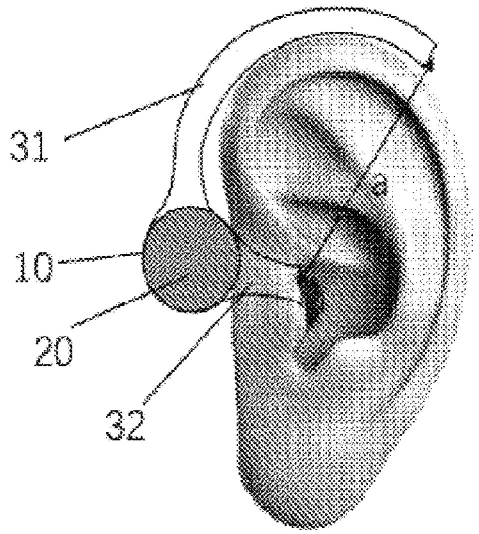
FIG. 6 is a schematic structural diagram of Embodiment Four of the disclosure.

Embodiment Three and Embodiment Four of the patent are shown in FIG. 5 and FIG. 6 respectively. In the embodiment of FIG. 5, the speaker 20 is located behind and above the ear, and in the embodiment of FIG. 6, the speaker 20 is located in front of the ear. The lengths of the rear conduction tube 31 and the front conduction tube 32 are inconsistent in the two embodiments, such that the sound waves radiated are unequal, and the mutual offset effect is weakened. In order to achieve good sound attenuation, signal characteristics at tail ends of the rear conduction tube 31 and the front conduction tube 32 may be respectively measured by a spectrum analysis device, and a diameter or the length of the rear conduction tube 31 or the front conduction tube 32 is adjusted according to actual needs, such that characteristics of the sound waves radiated by the two conduction tubes are similar, thereby accurately achieving a best sound attenuation effect.

With the decrease of the diameter or the increase of the length of the conduction tube, a loudness can be lowered and high frequency responses can be reduced. Therefore, if a response sensitivity of the front conduction tube 32 is greater than that of the rear conduction tube, it is necessary to increase the diameter of the rear conduction tube 31 or reduce the length of the rear conduction tube 31 until characteristics of frequency responses of the two conduction tubes have a difference within 6 dB after smoothed by ⅓ octave.

Figure 7:
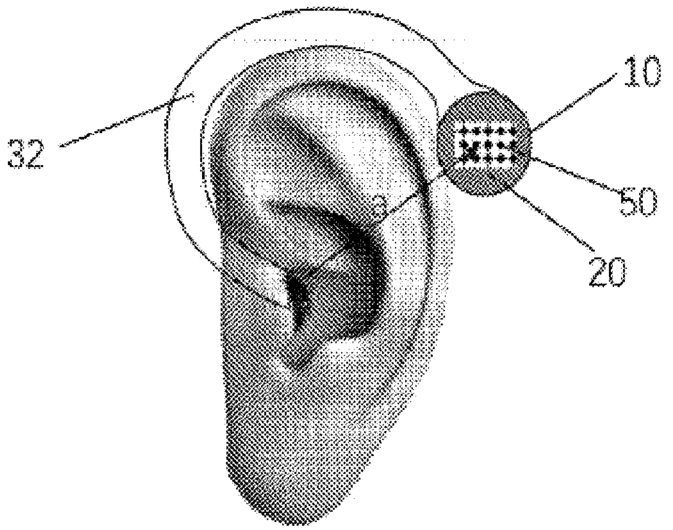
FIG. 7 is a schematic structural diagram of Embodiment Five of the disclosure.

Embodiment Five of the patent is shown in FIG. 7, and Embodiment Five has the same principle as the previous four embodiments. In this embodiment, the speaker 20 is located behind the ear, and the rear conduction tube is omitted, leaving only the front conduction tube 32. Similarly, the distance between the tail end of the front conduction tube 32 and the opening of the ear canal is less than 10 mm, and the minimum distance for the sound wave radiated by the speaker 20 to be conducted to the opening of the ear canal is no less than 40 mm. In this embodiment, since there is no rear conduction tube 31, the sound wave radiated by the back surface of the speaker 20 will be greater than the sound wave radiated by the tail end of the front conduction tube 32, such that good mutual offset cannot be realized. In order to improve the call privacy, an opening area and a radiation damping of the radiation port 50 on the back surface of the speaker 20 may be adjusted as needed to achieve radiation characteristics similar to those at the tail end of the front conduction tube 32, thereby improving the sound attenuation effect.

There are two debugging methods for the device in the disclosure before leaving the factory, one is radiation by the conduction tube, and the other is direct radiation by the speaker. In both methods, the design in front of the opening of the ear canal should be determined first, response characteristics of the orifice of the front conduction tube 32 should be measured, and then the rear conduction tube 31 or the radiation port of the speaker is adjusted to be matched with the front conduction tube 32, with a goal that a difference between frequency response curves of front and rear sound waves after smoothed by ⅓ octave is no more than 6 dB.

1. Debugging of conduction tube: if it is found that the rear conduction tube 31 has a higher sensitivity or more high frequencies after debugging, the cross-sectional area of the rear conduction tube 31 may be reduced or the length of the rear conduction tube 31 may be increased; and conversely, the cross-sectional area of the rear conduction tube 31 may be increased or the length of the rear conduction tube 31 may be reduced.
2. Direct radiation by speaker: if the sound wave radiated by the speaker 20 has a higher sensitivity or more high frequencies than the front conduction tube 32, an area of the radiation port 50 may be reduced; and conversely, the area of the radiation port 50 may be increased, and a damping may usually be used to reduce a radiation sensitivity and make a curve smoother. This debugging method is suitable for Embodiment Five.

Figure 8:
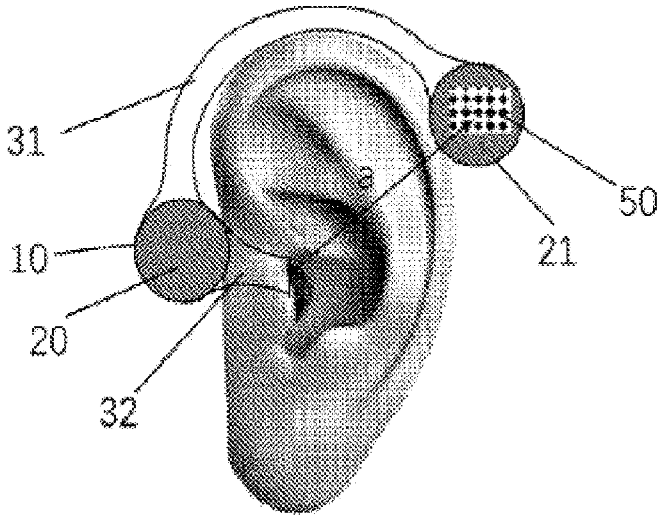
FIG. 8 is a schematic structural diagram of Embodiment Six of the disclosure.

FIG. 8 is a variation based on the embodiment of FIG. 6. A rear speaker 21 is added based on the embodiment of FIG. 6. The rear speaker 21 is located at the tail end of the rear conduction tube 31, and is hermetically mounted with the rear conduction tube 31. The distance for the sound wave radiated by the speaker 21 to be conducted to the opening of the ear canal is no less than 40 mm. By controlling polarities of signals input by the speaker 20 and the rear speaker 21, the two speakers drive air in the rear conduction tube 31 to move in the same direction. An area and a damping of the radiation port 50 of the rear speaker 21 are controlled, such that a sound wave radiated by the rear speaker 21 and the sound wave radiated by the front conduction tube 32 have the same amplitude and opposite phases, thereby realizing sound attenuation. Debugging in this embodiment may also be performed by using the second debugging method above, this embodiment is advantageous in that it can conveniently prevent water and dust from entering the conduction tube 31, thereby realizing waterproof and dustproof.

The embodiments described in the disclosure are only descriptions of the preferred embodiments of the disclosure, and are not intended to limit the concept and scope of the disclosure, and various modifications and improvements made by engineering technicians in the art to the technical solution of the disclosure without departing from the design concept of the disclosure should all fall within the scope of protection of the disclosure.

What is claimed is:

1. An ear hook personal sound device, comprising a housing, a speaker and a front conduction tube, wherein one surface of the speaker is connected and sealed with the front conduction tube, a radiation port is formed on the speaker, and a distance for a sound wave radiated by the speaker to be conducted through the front conduction tube to an opening of an ear canal is d, d<=10 mm; and the other surface of the speaker is configured to directly radiate a sound wave to air and to the opening of the ear canal or conduct the sound wave through a rear conduction tube to the opening of the ear canal, with a shortest conduction distance being a.

2. The ear hook personal sound device of claim 1, wherein an orifice of the front conduction tube is provided with an inclined opening bent inwardly, with an angle θ of the opening satisfying a condition of $-60° < \theta < 60°$.

3. The ear hook personal sound device of claim 1, wherein the rear conduction tube is hermetically connected with the other surface of the speaker, and after a sound wave radiated by the other surface of the speaker is conducted to a back of an ear through the rear conduction tube, a shortest conduction distance for the sound wave radiated by an orifice of the rear conduction tube to be conducted to the opening of the ear canal is a, a=>40 mm.

4. The ear hook personal sound device of claim 3, wherein the speaker is arranged in front of the ear, a cross-sectional area error between the front conduction tube and the rear conduction tube does not exceed ±20%, and a length error does not exceed ±20%.

5. The ear hook personal sound device of claim 3, wherein a cross-sectional area of the front conduction tube is no more than ½ of an effective radiation area of the speaker.

6. The ear hook personal sound device of claim 3, wherein the speaker is arranged behind the ear, the front conduction tube is configured to bypass the ear and conduct the sound wave to a range of 10 mm near the opening of the ear canal, and lengths of the rear conduction tube and the front conduction tube are inconsistent.

7. The ear hook personal sound device of claim 3, wherein the speaker is arranged in front of the ear near the ear canal, the rear conduction tube is configured to bypass the ear to conduct the sound wave to the back of the ear, and lengths of the rear conduction tube and the front conduction tube are inconsistent.

8. The ear hook personal sound device of claim 1, wherein when the sound wave directly radiated to air by the speaker is conducted to the opening of the ear canal, the speaker is arranged behind the ear and has the shortest conduction distance a which is no less than 40 mm; and after the sound wave directly radiated to air by the speaker and the sound wave radiated by the orifice of the front conduction tube are smoothed by ⅓ octave, a difference between frequency response curves of front and rear sound waves is no more than 6 dB.

9. The ear hook personal sound device of claim 7, wherein a tail end of the rear conduction tube is provided with a rear speaker, the rear speaker is connected and sealed with the rear conduction tube, and the speaker and the rear speaker drive air in the rear conduction tube to move in the same direction; and after the sound wave radiated to air by the rear speaker and the sound wave radiated by the orifice of the front conduction tube are smoothed by ⅓ octave, a difference between frequency response curves of front and rear sound waves is no more than 6 dB.

10. The ear hook personal sound device of claim 1, wherein a/d>8.

* * * * *